(12) United States Patent
Halli et al.

(10) Patent No.: US 12,452,687 B2
(45) Date of Patent: Oct. 21, 2025

(54) RADIO FREQUENCY PLAN GENERATION FOR NETWORK DEPLOYMENTS

(71) Applicant: HEWLETT PACKARD ENTERPRISE DEVELOPMENT LP, Houston, TX (US)

(72) Inventors: Siddharood Halli, Bangalore (IN); Gopal Gupta, Bangalore (IN); Ajay Vishwanath Bhande, Bangalore (IN); Charan Malyala, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 627 days.

(21) Appl. No.: 17/582,241

(22) Filed: Jan. 24, 2022

(65) Prior Publication Data

US 2023/0180018 A1    Jun. 8, 2023

(30) Foreign Application Priority Data

Dec. 3, 2021   (IN) .............................. 202141056083

(51) Int. Cl.
  *H04W 16/18*  (2009.01)
  *H04W 24/02*  (2009.01)
(52) U.S. Cl.
  CPC ........... *H04W 16/18* (2013.01); *H04W 24/02* (2013.01)
(58) Field of Classification Search
  CPC .............................. H04W 16/18; H04W 24/02
  See application file for complete search history.

(56) References Cited

U.S. PATENT DOCUMENTS

| 4,558,438 | A  | 12/1985 | Jones et al. |
| 7,003,403 | B1 | 2/2006  | Dougherty et al. |
| 7,243,112 | B2 | 7/2007  | Qu et al. |
| 9,172,915 | B2 | 10/2015 | Nicholas et al. |
| 2001/0022558 | A1* | 9/2001 | Karr, Jr. ................ G01S 5/0278 342/450 |

(Continued)

FOREIGN PATENT DOCUMENTS

| CA | 2199588 A1 * | 9/1998 | |
| CA | 2674613 A1 * | 7/2008 | ............. G06Q 10/06 |

(Continued)

OTHER PUBLICATIONS

GitHub, "pix2pix," Retrieved online Mar. 27, 2025, https://github.com/phillipi/pix2pix, 8 pages.
GitHub, "pix2pix-tensorflow," Retrieved online Mar. 27, 2025, https://github.com/affinelayer/pix2pix-tensorflow, 8 pages.
Isola, P., et al., "Image-to-Image Translation with Conditional Adversarial Networks," Version 1, Nov. 21, 2016, 16 pages.
Isola, P., et al., "Image-to-Image Translation with Conditional Adversarial Networks," Version 3, Nov. 26, 2018, 17 pages.

(Continued)

*Primary Examiner* — Saad A. Waqas
(74) *Attorney, Agent, or Firm* — Dickinson Wright

(57) ABSTRACT

Examples described herein relate to generation of radio frequency (RF) plans for network deployments. Examples described herein may receive an input RF plan with modified set of features of a network deployment area. A first machine learning (ML) model generates an intermediate RF plan indicating candidate AP locations based on the modified set of features and a first set of parameters. A second ML model determines a network optimization score for the intermediate RF plan. Based on the optimization score, the first set of parameters are optimized. The first ML model generates an output RF plan indicating optimized AP locations based on the optimized first set of parameters and the modified set of features.

19 Claims, 7 Drawing Sheets

(56) References Cited

U.S. PATENT DOCUMENTS

| | | |
|---|---|---|
| 2006/0184617 A1 | 8/2006 | Nicholas et al. |
| 2008/0126476 A1 | 5/2008 | Nicholas et al. |
| 2014/0221232 A1 | 8/2014 | Prehn et al. |
| 2016/0343037 A1 | 11/2016 | Nicholas et al. |
| 2020/0314659 A1* | 10/2020 | Hannan .............. H04W 52/243 |
| 2022/0038858 A1* | 2/2022 | Rea ..................... H04W 24/02 |
| 2022/0232396 A1* | 7/2022 | Cavcic ............... H04B 7/15507 |

FOREIGN PATENT DOCUMENTS

| | | | | |
|---|---|---|---|---|
| CA | 3034350 A1 * | 3/2018 | ......... | G06K 9/00369 |
| CN | 110705590 A * | 1/2020 | ........... | G06K 9/6268 |
| CN | 111033181 A * | 4/2020 | ......... | G01C 21/3423 |
| CN | 113508066 A * | 10/2021 | .......... | B60W 30/182 |
| WO | WO-2019092439 | 12/2017 | | |
| WO | WO-2019092439 A1 * | 5/2019 | ......... | G06K 9/00791 |

OTHER PUBLICATIONS

Perera, P., et al., "In2I: Unsupervised Multi-Image-to-Image Translation Using Generative Adversarial Networks," Aug. 20, 2018, IEEE, pp. 140-146.

TensorFlow, pix2pix: Image-to-Image Translation with a Conditional GAN, available online at <https://www.tensorflow.org/tutorials/generative/pix2pix>, Aug. 16, 2024, 35 pages.

Aruba, "AirWave 8.3.0 User Guide", Hewlett Packard Enterprise Development LP, 2023, 461 Pages.

Badrinarayanan, V. et al., "SegNet: A Deep Convolutional Encoder-Decoder Architecture for Image Segmentation,", Dec. 2017, IEEE Transactions on Pattern Analysis and Machine Intelligence, 39.12, pp. 2481-2495.

Kaymak, C. et al., "A Brief Survey and an Application of Semantic Image Segmentation for Autonomous Driving," Feb. 26, 2019, Handbook of Deep Learning Applications, pp. 161-200.

* cited by examiner

RADIO FREQUENCY PLAN GENERATION FOR NETWORK DEPLOYMENTS

BACKGROUND

Radio Frequency (RF) planning is a process of deploying or modifying a network to maximize network coverage in a network deployment area. Deploying or modifying the network may include analyzing the network deployment area to determine a layout of network devices that facilitate wireless capability in that network deployment area. For example, an administrator may survey a network deployment area to determine a suitable number of access points (APs) and their locations to provide network services to client devices in that network deployment area.

Generally, administrators create an RF plan for each network deployment area. The RF plan may be a visual representation that depicts a number and location of each AP to be deployed in the network deployment area. Based on the RF plan, an administrator may set up network connections (e.g., wireless connections), determine network resource allocation (e.g., bandwidth), or the like, to provide sufficient coverage and capacity to each client device in the network deployment area.

BRIEF DESCRIPTION OF THE DRAWINGS

For a more complete understanding of the present disclosure, examples in accordance with the various features described herein may be more readily understood with reference to the following detailed description taken in conjunction with the accompanying drawings, where like reference numerals designate like structural elements, and in which.

Figure 1:
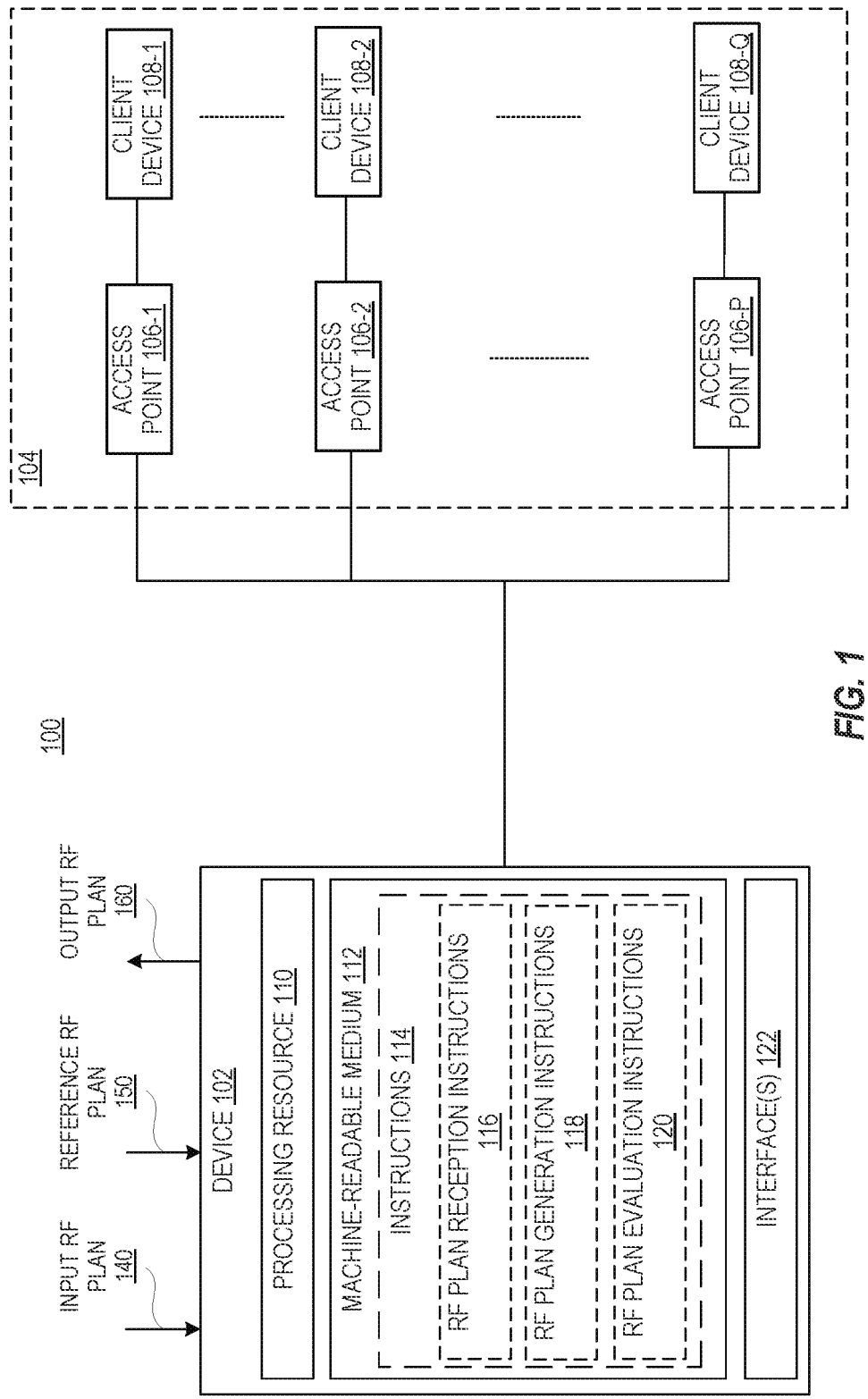
FIG. 1 is a block diagram of a network including a device that generates radio frequency (RF) plans with optimized access point (AP) locations, in accordance with an example.

Certain examples have features that are in addition to or in lieu of the features illustrated in the above-referenced figures. Certain labels may be omitted from certain figures for the sake of clarity.

DETAILED DESCRIPTION

Radio frequency (RF) planning is a process to deploy new networks or modify existing networks in network deployment areas. A network deployment area refers to an area or a site, such as a building, a campus, or the like, where wireless network devices are installed. The RF planning process often includes surveying and analyzing the network deployment area to determine an optimized layout of the wireless network devices (e.g., access points (APs)), which provide sufficient coverage of radio signals to a maximum number of client devices in that area. For example, an administrator (e.g., Information Technology (IT) administrator) may visit a building to gather information or "features", such as spatial features (e.g., walls, rooms, doors, etc.) of that building and capture such features in a floor plan. Additionally, the administrator may augment the floor plan by capturing network features (e.g., user densities, AP types, etc.) to create a radio frequency (RF) plan. An RF plan is a visual representation of a network deployment area, showing a view from above, of relationships between the various features of the network deployment area. Each feature may include one or more attributes that quantify the corresponding feature. For example, an RF plan for a building may depict a room feature with a surface area attribute, a ceiling feature with a height attribute, a door feature with orientation and height attribute, a user density feature with a number of user devices attribute, or the like.

Generally, administrators are tasked with the difficult objective of providing consistent and high network performance throughout large buildings and campuses with reduced network infrastructure costs. For example, an administrator may have to ensure that high bandwidth, high throughput, low latency, and low interference are achieved in the network with a minimum number of APs or other network devices. As a result, determining the placement of such APs is crucial and is often a highly manual process undertaken by well-trained administrators.

In some existing solutions, an administrator determines the placement of APs by creating one or more RF plan(s) based on the features of the network deployment area. For example, the administrator captures the spatial features surveyed from the network deployment area and the network features to design the RF plan. The administrator analyzes the various features and their relationships to identify "optimized" locations in the RF plan for deploying or re-deploying the APs. For example, the administrator may attempt to understand the effect of the spatial features, such as ceiling, rooms, open areas, etc., and the network features, such as AP types, user densities on certain network metrics, such as throughput, bandwidth, etc., and calibrate AP locations accordingly. The optimized locations in the RF plan may correspond to locations in the network deployment area where the APs or other network devices may be deployed for optimization of the network metrics of the network in the network deployment area.

However, manually creating RF plans and identifying optimized AP locations in such RF plans may be error-prone, burdensome, and may affect network performance in the network deployment areas. For example, an administrator may inaccurately capture a feature (such as user density) or may entirely miss out on capturing a feature (such as a wall) of the network deployment area. In another case, the administrator may inadvertently provide inaccurate attributes, such as dimensions, orientations, positions, or the like, of the various features of the network deployment area while creating the RF plan. In such cases, the administrator rectifies such errors by modifying the features depicted in the RF plan. As a result, the administrator has to identify a new set of optimized AP locations based on the modifications to the features in the RF plan. Additionally, in some cases, the administrator may iteratively modify the network deployment area after creating the RF plan. For example, one or more false wall(s) or false ceiling(s) may be added after the administrator has visited the network deployment area. Often, such features of the network deployment area involve multiple modifications in final stages of the RF planning. In such cases, the administrator modifies the features depicted in the RF plan and has to identify a new set of optimized AP locations to ensure desired network performance in the modified network deployment area. It may be tedious and burdensome for the administrator to keep track of such modifications, the effect of such modifications on the network metrics, and accurately adjust the optimized AP locations in the RF plans for the network deployment areas.

In some examples consistent with this disclosure, a modified RF plan of a network deployment area is provided as input to a first machine learning (ML) model, which generates an intermediate RF plan with candidate AP locations based on modifications in the modified RF plan. A second ML model determines whether the candidate AP locations provide optimization of network metrics, such as bandwidth, throughput, latency, etc. Based on the determination, the first ML model is suitably tuned to determine improved AP locations, and generate an updated RF plan. The updated RF plan indicates the improved AP locations that achieve the desired network metrics optimization.

Examples of this disclosure improve the field of network deployment and RF planning. The technical improvements are achieved by determining improved AP locations for modified RF plans such that network devices experience high bandwidth, high throughput, reduced interference, low latency, among other benefits. Examples of this disclosure apply ML models within the technical context of extracting and processing spatial and network characteristics from RF plans of an area, thereby reducing manual intervention and burden of the administrators. Examples of this disclosure reduce manual interventions and in-person visits to a network deployment area, thereby increasing efficiency in RF planning.

FIG. 1 depicts an example network 100 including a device to facilitate generation of radio frequency (RF) plans with optimized access point (AP) locations for a network deployment area. The network 100 includes at least an RF plan generation device 102 (referred to herein as "device 102") in communication with one or more network site(s) or network deployment area(s), such as a network deployment area 104.

A network deployment area refers to a site (e.g., a building, a floor, a campus, or the like) where a plurality of network devices are deployed, installed, and operated. One or more of the network devices communicate with the device 102 via the network 100. The network devices include APs 106-1 through 106-P (where P is an integer greater than or equal to 2). Each of the APs 106-1 to 106-P are connected to one or more client devices 108-1 through 108-Q (where Q is an integer greater than or equal to 2). An AP (from the APs 106-1 to 106-P) allows a client device (from the client devices 108-1 to 108-Q) to connect to a wired or wireless network. Although, for illustrative purposes, FIG. 1 shows one device 102, one network deployment area 104, and a limited number of APs 106-1 to 106-P and client devices 108-1 to 108-Q, the network 100 may include any suitable number of devices, network deployment areas, access points, and client devices.

The device 102 includes at one processing resource 110 and at least one machine-readable medium 112 storing (e.g., encoded with) instructions 114. The instructions 114 include at least RF plan reception instructions 116, RF plan generation instructions 118, and RF plan evaluation instructions 120. The device 102 includes one or more interface(s) 122 to receive data including, but not limited to, RF plans 140, 150, features in the RF plans, or the like, from an external device (not shown in FIG. 1). The one or more interface(s) 122 may include one or more of a network interface (e.g., network interface card, network port, etc.) or a user interface (e.g., a graphical user interface, a display screen, etc.).

An RF plan is an image depicting a visual representation of a network deployment area, showing a view from above, of relationships between the various features of the network deployment area. The features include spatial and network features of the network deployment area. The spatial features describe the physical or structural information of the network deployment area, while the network features describe network-related information. Examples of the spatial features of a network deployment area include walls, rooms, doors, open areas, ceilings, or the like. Examples of the network features include, but not limited to, access point location, access point type, user density, or the like.

The device 102 generates RF plans indicating optimized AP locations. The processing resource 110 of the device 102 executes the instructions 114 stored in the machine-readable medium 112.

The processing resource 110 executes RF plan reception instructions 116 to receive a reference RF plan 150 and an input RF plan 140 of a network deployment area from an administration device (e.g., a client device from the client devices 108-1 to 108-Q) operated by an administrator. The reference RF plan 150 depicts an original set of features of the network deployment area 104 and an existing layout of the network devices (e.g., APs 106-1 to 106-P and client devices 108-1 to 108-Q) in the network deployment area 104. The existing layout refers to the original number and original locations of the APs 106-1 to 106-P and the client devices 108-1 to 108-Q in the network deployment area 104. The original locations of the APs 106-1 to 106-P in the existing layout provide optimized network performance in terms of bandwidth, throughput, latency, interference, or other network metrics, with respect to the original set of features. For example, when the APs are positioned at the original AP locations for a given original set of features, the throughput values (or other network metric values) may be in a desired range of predetermined throughput values (e.g., greater than 2 megabits per second) for network devices in the network deployment area 104.

The input RF plan 140 depicts a modified set of features of an existing network deployment area (i.e., the network deployment area 104). In some examples, an administrator modifies the layout depicted in the reference RF plan 150 by adding new features, removing existing features, or the like. Adding a new feature in an RF plan includes inserting a new feature, such as wall(s), cubicle(s), room(s), or the like, while removing an existing feature in the RF plan includes deleting one or more of the original set of features. To ensure that the network performance is optimized despite such modifications, the administrator provides the modified reference RF plan as an input RF plan 140 to the device 102, which determines optimized AP locations with respect to the modifications.

In response to receiving the input RF plan 140, the device 102 processes the input RF plan 140 to generate a new RF plan with new AP locations, which optimize network metrics that govern the network performance. For example, the processing resource 110 executes the RF plan generation instructions 118 to generate an intermediate RF plan corresponding to the input RF plan 140 using a first machine learning (ML) model. The input RF plan 140 is inputted to the first ML model, which determines candidate AP locations based on the modified set of features in the input RF plan 140 and a first set of parameters of the first ML model. The first ML model generates the intermediate RF plan indicating the candidate AP locations and the modified set of parameters.

The processing resource 110 executes the RF plan evaluation instructions 120 to determine network optimization score for the intermediate RF plan using a second ML model. The network optimization score is a measure of optimization of network metrics, such as bandwidth, throughput, latency, interference, or the like. A network metric is optimized if the network metric value is in a range of predetermined values. For example, a network metric, such as throughput, is said to be optimized when the throughput values at network devices are in a range of predetermined throughput values.

The second ML model predicts the network metric values based on the modified set of features and the candidate AP locations. For example, the second ML model predicts the throughput in the network due to modifications in the features (e.g., addition of walls) and the candidate AP locations in the intermediate RF plan. The predicted throughput value is compared with a range of predetermined values to determine whether the throughput is optimized. Similarly, each network metric value is predicted and compared with a respective range of threshold values. In some examples, the network optimization score is computed based on the network metrics that are optimized. Optimized network metrics may be assigned a score (e.g., "1") and non-optimized metrics may be assigned a different score (e.g., "0"). For example, if throughput, bandwidth, and latency are optimized (i.e., throughput, bandwidth, latency values are in a respective range of predetermined values), then a score of "1" is assigned to those metrics. The network optimization score may be computed based on the scores for each metric. For example, the network optimization score may be an average of the scores assigned for each metric.

The processing resource 110 executes the RF plan evaluation instructions 120 to determine an error value for the intermediate RF plan using the second ML model. The error value indicates a difference in the network optimization score for the intermediate RF plan and the network optimization score for the reference RF plan. Based on the error value, the first set of parameters of the first ML model is updated to determine an optimized first set of parameters. For example, in response to a determination that the error value is greater than a threshold, the first set of parameters are updated based on the error value.

The processing resource 110 executes the RF plan generation instructions 118 to generate an output RF plan using the first ML model based on the optimized first set of parameters. The generated output RF plan indicates the optimized AP locations and the modified set of features. The optimized AP locations correspond to locations in the network deployment area where APs may be deployed to achieve network optimization. For example, if the APs are positioned in the optimized AP locations indicated in the output RF plan, then the bandwidth, the throughput, the latency, the interference, or other network metrics may be optimized, i.e., in the range of respective predetermined values.

Figure 2:
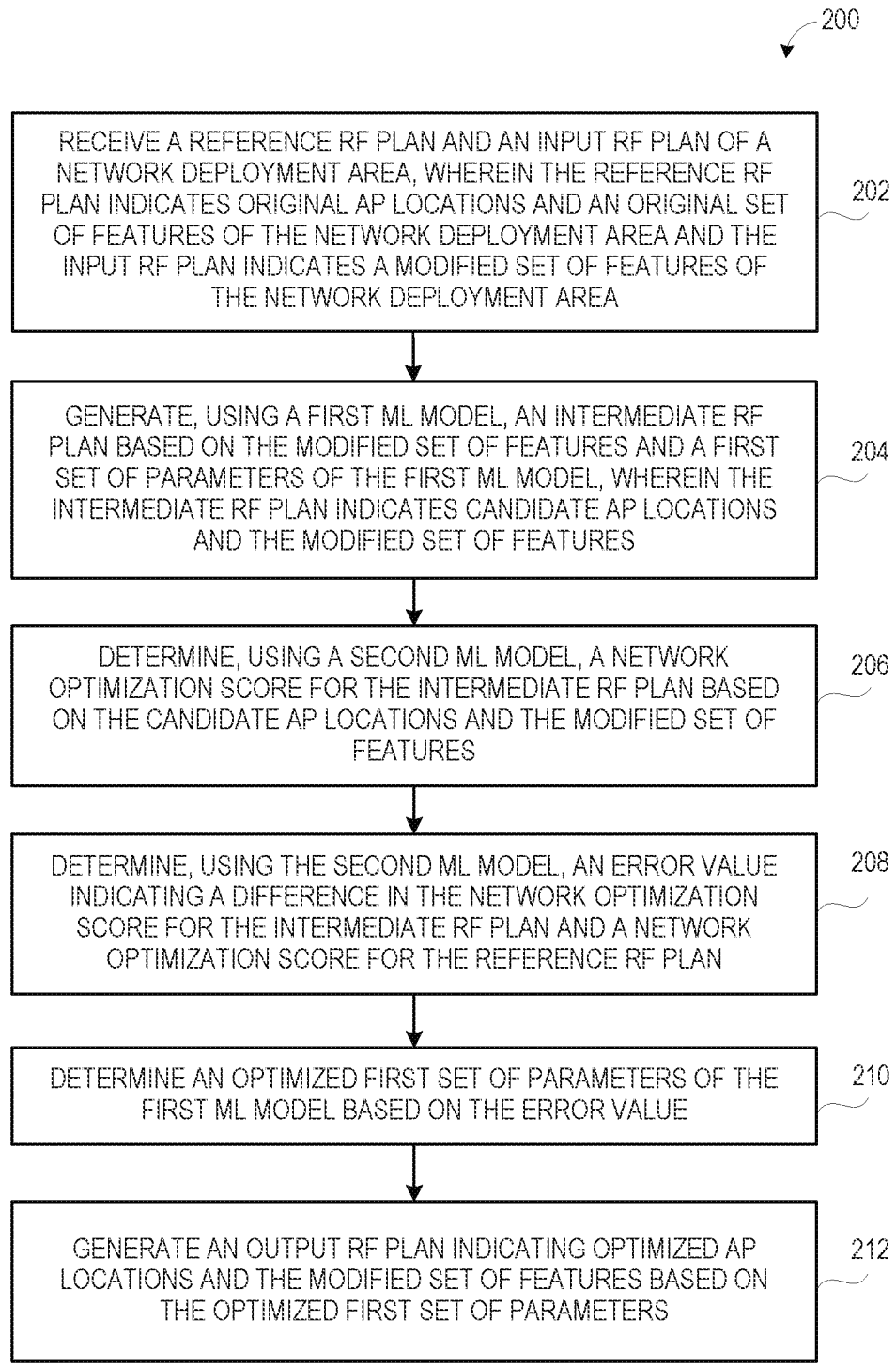
FIG. 2 is a flowchart of a method to generate RF plans with optimized AP locations, in accordance with an example.

FIG. 2 is a flowchart of an example method 200 to generate RF plans indicating optimized AP locations for a network deployment area. In some examples, method 200 may be encoded as instructions in a computer-readable medium and executed on a device (e.g., device 102) of FIG. 1. Examples will now be described in relation to FIGS. 1 and 2.

At block 202, method 200 includes receiving a reference RF plan 150 and an input RF plan 140 of a network deployment area from an administration device (e.g., a client device from the client devices 108-1 to 108-Q) operated by an administrator. As described above, the reference RF plan 150 depicts an original set of features and original AP locations of the network deployment area 104. The original locations of the APs 106-1 to 106-P provide optimized network performance such that the network metrics like bandwidth, throughput, latency, interference, or the like, are optimized with respect to the original set of features. In some examples, optimizing network metrics includes maximizing or minimizing values of certain network metrics. For example, some network metrics like bandwidth or throughput may be maximized and other latency or interference may be minimized.

The input RF plan 140 includes a modified set of features of an existing network deployment area (i.e., the network deployment area 104). For example, an administrator may modify the layout depicted in the reference RF plan 150 by adding new features, removing existing features, or the like. Adding a new feature in an RF plan includes inserting a new feature, such as wall(s), cubicle(s), room(s), or the like, while removing an existing feature in the RF plan includes deleting one or more of the original set of features. In some examples, modifying the reference RF plan 150 also includes changing attributes of the existing features. For example, an administrator may increase the height attribute of a ceiling, increase the surface area of corridors, or the like, in the reference RF plan. The administrator provides the modified reference RF plan as an input RF plan 140 to the device 102.

At block 204, method 200 includes generating an intermediate RF plan using a first ML model. The input RF plan is inputted to the first ML model, which generates the intermediate RF plan indicating the candidate AP locations and the modified set of features. In some examples, the first ML model extracts the modified set of features from the input RF plan using an image segmentation process. In some examples, the image segmentation process includes segmenting the input RF plan into a plurality of smaller images or "groups" based on a property, such as pixel values. Each group includes a collection of pixels that may be adjacent to each other in the input RF plan. The first ML model classifies or labels each group based on the property. For example, groups having similar pixels (e.g., similar color components) may have a common label. The label may be a feature of the modified set of features, such as a wall, a room, a door, a user density, or the like.

The first ML model predicts candidate AP locations based on the modified set of features extracted from the input RF plan and a first set of parameters of the first ML model. For example, the first ML model may be trained to predict AP locations with respect to the features like walls, ceilings, user density, etc. The predicted candidate AP locations and the modified set of features are combined to generate the intermediate RF plan.

At block 206, RF plan evaluation instructions 120 determines network optimization score for the intermediate RF plan using a second ML model. The network optimization score indicates optimization of network metrics, such as bandwidth, throughput, latency, interference, or the like. A network metric is optimized if the network metric is in a range of predetermined values. For example, a network metric, such as throughput, is said to be optimized when the throughput values at network devices are in a range of predetermined throughput values.

The second ML model predicts the network metric values based on the modified set of features and the candidate AP locations. For example, the second ML model predicts the throughput in the network due to modifications in the features (e.g., addition of walls) and the candidate AP locations in the intermediate RF plan. The predicted throughput value is compared with a range of predetermined values to determine whether the throughput is optimized. Similarly, each network metric value is predicted and compared with a respective range of threshold values.

In some examples, the network optimization score is computed based on the network metrics that are optimized. Optimized network metrics may be assigned a score (e.g., "1") and non-optimized metrics may be assigned a different score (e.g., "0"). For example, if throughput, bandwidth, and latency are optimized (i.e., throughput, bandwidth, latency values are in a respective range of predetermined values), then a score of "1" is assigned to those metrics. The network optimization score may be computed based on the scores for each network metric. For example, the network optimization score may be an average or sum of the scores assigned for each network metric.

At block 208, RF plan evaluation instructions 120 determines an error value for the intermediate RF plan using a second ML model. The error value indicates a difference in network optimization score for the intermediate RF plan and the network optimization score for the reference RF plan. For example, if the network optimization score for the intermediate RF plan is "1" and the network optimization score for the reference RF plan is "3", then the error value is computed as "2" (3–1). In some examples, the error value is used for adjusting AP locations to obtain a range of predetermined values for one or more network metric(s).

At block 210, method 200 determines an optimized first set of parameters of the first ML model based on whether the error value is greater than a threshold. If the error value is greater than a threshold, it may indicate that one or more of the network metrics are not optimized (i.e., not in a range of predetermined values). In an example, if the throughput of the network devices is not in the range of predetermined values, one or more parameters from the first set of parameters are adjusted based on the error value. In some examples, the one or more parameters are adjusted iteratively to calibrate the AP locations such that the network metrics (e.g., throughput) are in the range of predetermined values. Based on such adjustments, the optimized first set of parameters of the first ML model is determined.

At block 212, method 200 generates an output RF plan using the first ML model based on the optimized first set of parameters. The output RF plan indicates optimized AP locations and the modified set of features. The optimized AP locations correspond to locations in the network deployment area where APs may be deployed so that the bandwidth, throughput, latency, interference, or other network metrics measured at network devices is in the range of predetermined values.

Figure 3:
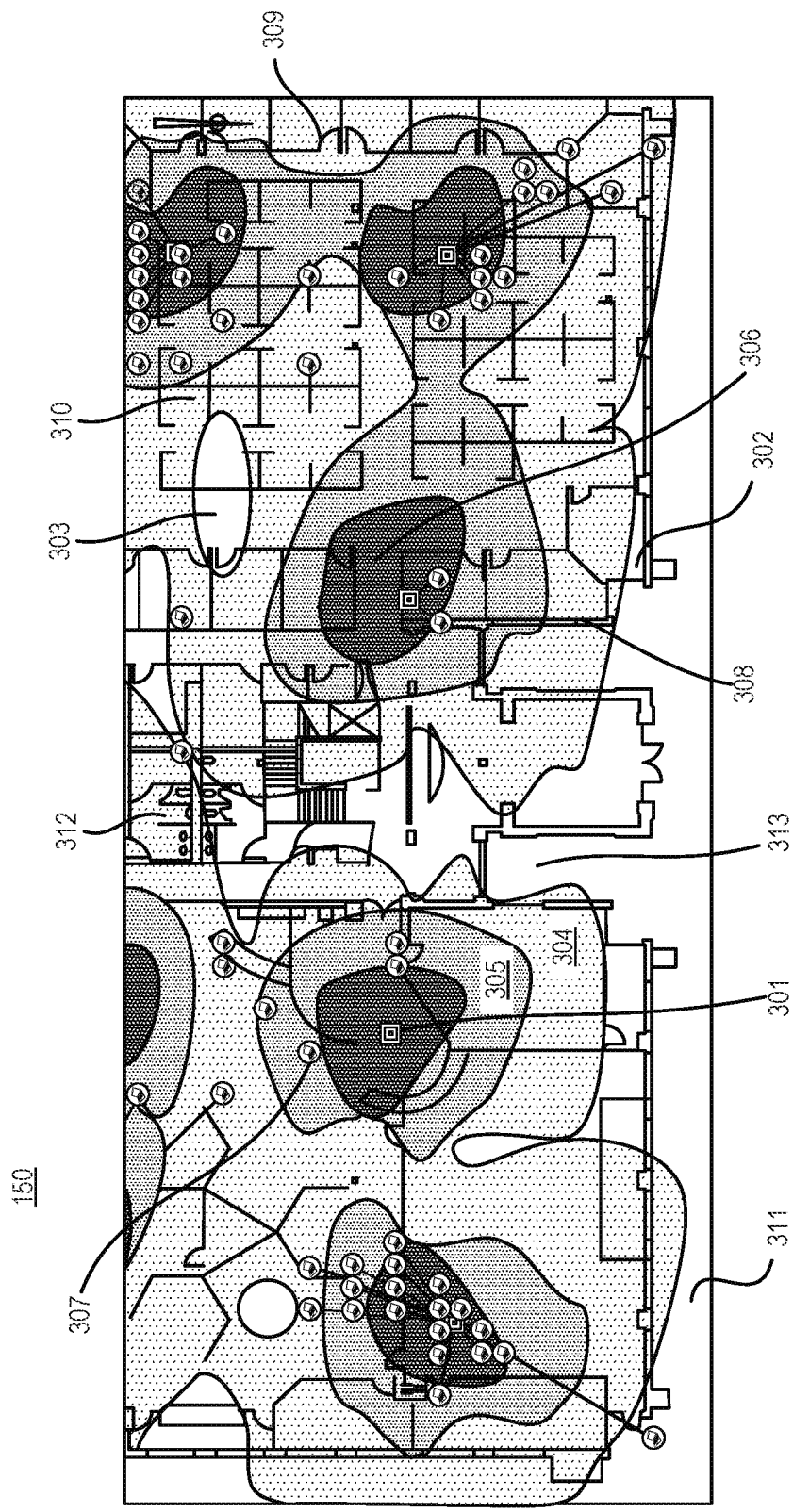
FIG. 3 is a reference RF plan, in accordance with an example.
Figure 4:
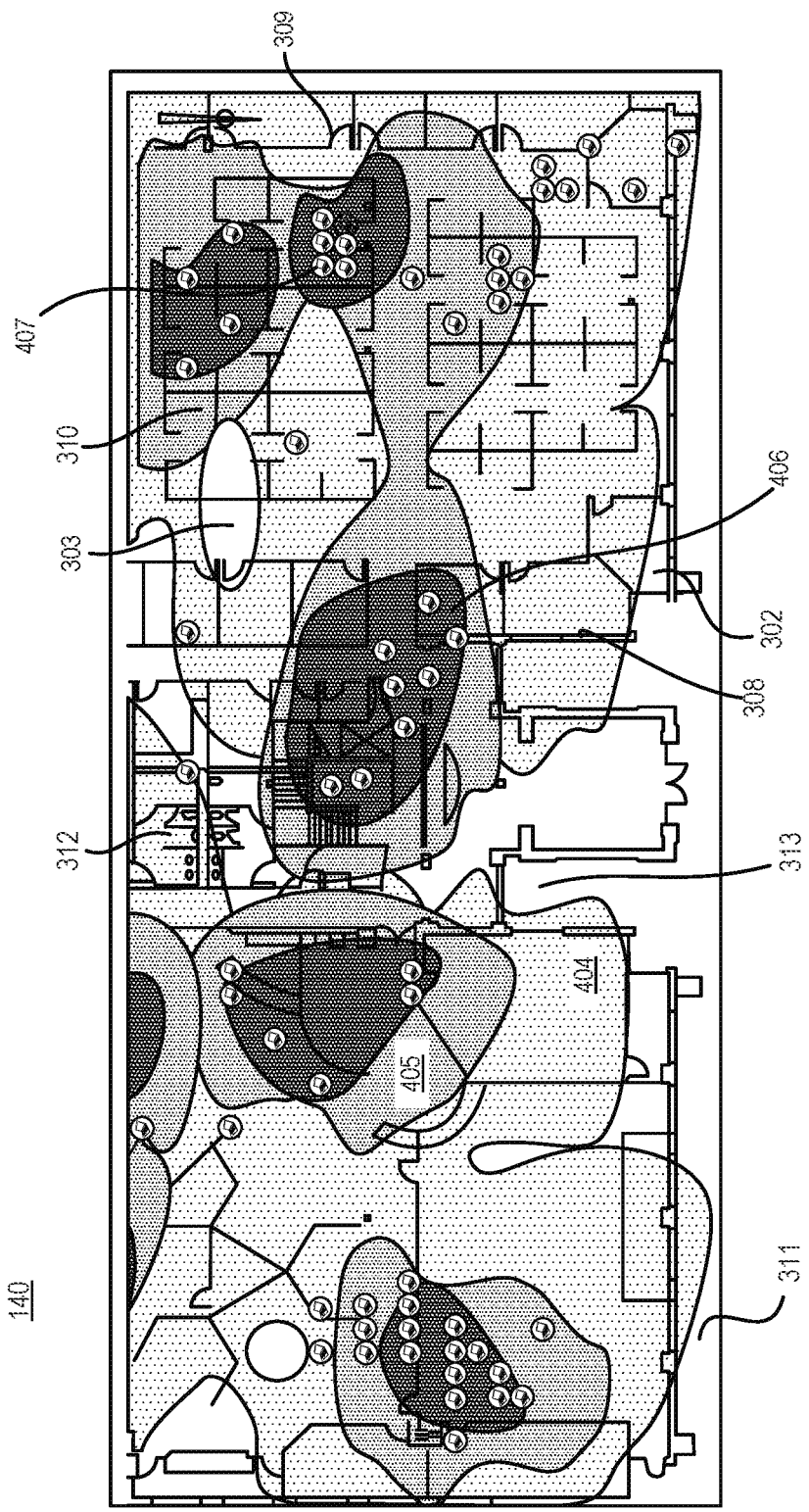
FIG. 4 is an input RF plan, in accordance with an example.

FIGS. 3 and 4 depict example RF plans of a network deployment area.

FIG. 3 depicts a reference RF plan 150 of a network deployment area, in accordance with an example. The reference RF plan 150 depicts an original set of features of a network deployment area with APs at their original locations. The reference RF plan 150 is representative of a floor plan of an office building which includes several features, such as AP locations 301, cabins 302, user densities 303, 304, 305, 306, client devices 307, walls 308, doors 309, cubicles 310, corridors 311, restrooms 312, and open areas 313. Each feature in the reference RF plan 150 is depicted by a different indicia, such as heat regions with varying patterns, lines, icons, or the like. The indicia in the reference RF plan 150 show the layout of the devices within the network deployment area. For example, the reference RF plan 150 includes icons 301 that depict the original location of the APs in the network deployment area. In some examples, the reference RF plan 150 may indicate the AP type (e.g., model or rating) or other settings of the APs. The reference RF plan 150 depicts the location of the client devices 307 at a particular point in time (i.e., when the reference RF plan was created). One or more of the client device(s) 307 may be stationary devices, while other client devices may be mobile.

The reference RF plan 150 includes heat region clusters, which represent the user density in certain locations of the network deployment area. The heat region clusters 303-306 indicate user densities within certain locations in the network deployment area. The heat region clusters graphically depict under-utilization of some network devices and over-utilization of other network devices (i.e., APs) deployed in the network deployment area. The degree of darkness of the pattern or shade of a heat region cluster corresponds positively to the user density within the corresponding deployment area. For example, heat region cluster 303 may indicate a 30% user density of the network deployed within the deployment area; the heat region cluster 304 may indicate a 30-50% user density of the network. Further, heat region cluster 305 may indicate a 50-75% user density of a network, and the heat region cluster 306 may indicate a 75-100% user density. In other examples, different color schemes may be used to indicate the user density in a particular heat region cluster.

FIG. 4 depicts an input RF plan 140 of the network deployment area, in accordance with an example. In some examples, the input RF plan 140 is created by modifying an RF plan (such as the reference RF plan 150). An administrator modifies the original set of features and attributes of the reference RF plan using an RF planning software application executing on a computing device (e.g., administration device), for example. In some examples, the administrator downloads the reference RF plan 150 from the device 102 on the administration device executing the software application. The administrator may perform such modifications to make changes to the network deployment area or to rectify incorrect representation of the network deployment area, or the like, for example.

For example, the administrator may change the size of heat region clusters, add or remove walls and doors, change dimensions or orientations of rooms, or the like, in the reference RF plan 150. As shown, the administrator changes the size of the heat region clusters 304, 305, 306, rearranges the position of one or more client devices 307, and removes one or more APs (icons 301) in the reference RF plan 150 of FIG. 3 to create the input RF plan 140 with new heat region clusters 404, 405, 406, new location of client devices 407 as shown in FIG. 4. The administrator may provide the input RF plan 140 to the device 102 of FIG. 1. The device 102 determines optimized AP locations in the modified reference RF plan (i.e., input RF plan 140) such that the network performance is optimized with respect to the modifications in internal environments like home, business, or external environments, etc.

Figure 5:
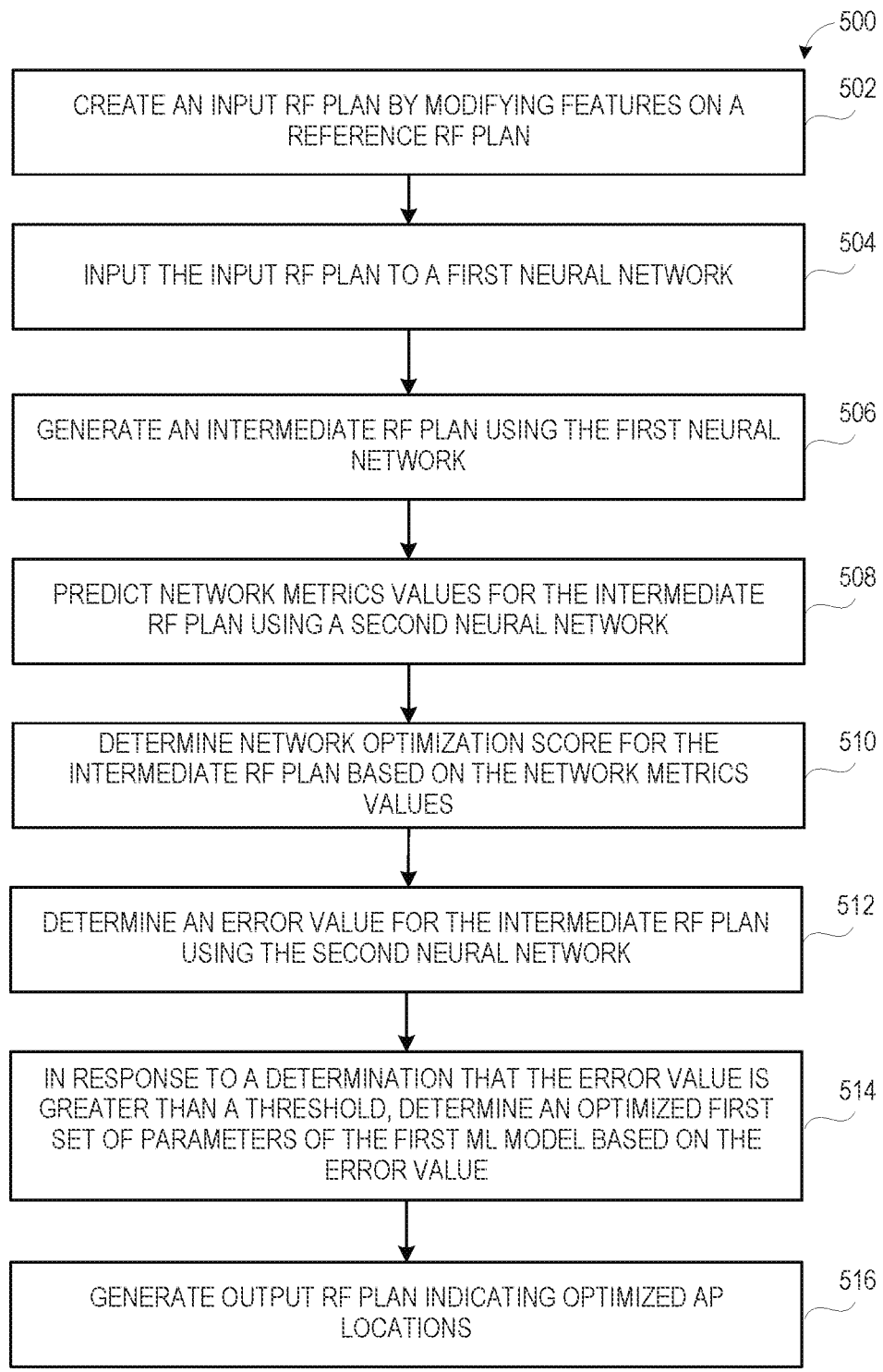
FIG. 5 is a flowchart of a method to generate RF plans with optimized AP locations, in accordance with another example.

FIG. 5 is a flowchart of a method to generate an RF plan indicating optimized AP locations using neural networks, in accordance with an example. In some examples, method 500 may be encoded as instructions in a computer-readable medium and executed on a device (e.g., device 102) of FIG. 1. Examples will now be described in relation to FIGS. 1, 3, 4, and 5.

At block 502, method 500 includes creating an input RF plan by modifying features of an existing RF plan (e.g., reference RF plan 150). In some examples, an administrator downloads a reference RF plan 150 (e.g., from the device 102) on a computing device (e.g., administration device). The administration device may execute an RF planning software application and may include a display with a user interface (e.g., a graphical user interface) for rendering RF plans. In other examples, the administrator creates the input RF plan at the device 102 via the interface 122 (e.g., graphical user interface). The administrator modifies the reference RF plan 150 by modifying the original set of features of the reference RF plan 150. As described in relation to FIG. 4, modifying one or more features includes inserting, editing, or removing one or more indicia corresponding to the original set of features on the RF plan. The administrator may provide the input RF plan 140 to the device 102 for determining optimized AP locations for the network deployment area represented by the input RF plan.

At block 504, method 500 includes inputting the input RF plan 140 to a first neural network. The first neural network includes multiple layers of nodes including an input layer, one or more hidden layers, and an output layer. The nodes are interconnected with each other and perform computations based on weights or parameters from the first set of parameters.

At block 506, method 500 includes generating an intermediate RF plan indicating the candidate AP locations and the modified set of features using the first neural network. The first neural network includes an input node in an input layer that receives the input RF plan. The input node provides the input RF plan to one or more node(s) in a first hidden layer that extract the features of the input RF plan using an image segmentation process. Each of one or more node(s) in the first hidden layer performs the image segmentation based on an activation function (e.g., sigmoid function, linear function, softmax function, or the like) and a parameter (e.g., from the first set of parameters) of the respective node. In some examples, each of the one or more node(s) of the first hidden layer performs image segmentation using classification methods, such as naive bayes, k-nearest neighbors, support vector machines, or the like. In some examples, the image segmentation process includes segmenting the input RF plan into multiple groups that include similar properties, such as pixel values, color, texture, or the like. The segmentation is performed by classifying or labeling each group as belonging to a feature of the input RF plan. For example, groups having similar pixel values in the region 404 of the input RF plan 140 are labeled as belonging to a feature with 30-50% user density. Similarly, groups having similar pixel values as 407 of the input RF plan are labeled as client devices. The first hidden layer in the first neural network labels each pixel as belonging to a particular feature based on the first set of parameters or weights assigned to each node of the one or more layers.

The first neural network includes one or more nodes in a second hidden layer that predict the AP locations based on the modified set of features in the input RF plan and the first set of parameters assigned to the one or more nodes in the second hidden layer. The first neural network includes one or more nodes in a third hidden layer that encode the extracted features into a latent space dataset based on the first set of parameters assigned to each node of the third hidden layer. The latent space dataset is a representation of compressed data in which similar data points are closer together in the dataset. For example, extracted features that have similar labels are represented closer to each other in the latent space dataset. The first neural network includes one or more nodes in a fourth hidden layer that decode the latent space dataset to generate an output RF plan based on the first set of parameters assigned to the one or mode nodes of the fourth hidden layer.

At block 508, method 500 includes predicting network metrics values for the intermediate RF plan using a second neural network. The second neural network includes an input layer, one or more hidden layers, and an output layer. The input layer receives the intermediate RF plan generated by the first neural network and the reference RF plan and provides the RF plans to one or more nodes in a first hidden layer. The one or more nodes in the first hidden layer predict the network metrics values based on a second set of parameters and the modified set of features of the intermediate RF plan. Each of the one or more nodes receives the modified set of features and performs computation (e.g., multiplication) with the respective parameter to predict the network metrics values. For example, the one or more nodes predict the throughput, bandwidth, latency, interference, or the like, due to modifications in the features.

At block 510, method 500 includes determining network optimization score for the intermediate RF plan based on the network metrics values. In some examples, one or more nodes in a second hidden layer determine the optimization score based on the predicted network metrics values. The network optimization score indicates optimization of network metrics, such as bandwidth, throughput, latency, interference, or the like. A network metric is optimized if the network metric value is in a range of predetermined values. For example, a network metric, such as throughput, is said to be optimized when the throughput values at network devices are in a range of predetermined throughput values.

The one or more nodes compare the predicted values with a range of predetermined values to determine whether the network metric is optimized. In some examples, the network optimization score is computed based on the network metrics that are optimized. In some examples, the optimized network metric may be assigned a score (e.g., "1") and non-optimized metric may be assigned a different score (e.g., "0"). For example, if throughput, bandwidth, and latency are optimized (i.e., throughput, bandwidth, latency values are in a respective range of predetermined values), then a score of "1" is assigned for those metrics. The network optimization score may be computed based on the scores for each metric. For example, the network optimization score may be an average of the scores assigned for each metric.

At block 512, method 500 includes determining an error value for the intermediate RF plan using the second neural network. One or more nodes in a third hidden layer determine an error value indicating a difference in network optimization score for the intermediate RF plan and the network optimization score for the reference RF plan. For example, if the network optimization score for the intermediate RF plan is "1" and the network optimization score for the reference RF plan is "3", then the error value is computed as 2 (as 3−1).

At block 514, method 500 includes determining an optimized first set of parameters of the first ML model if the error value is greater than a threshold. If the error value is greater than a threshold, it may indicate that one or more of the network metrics are not optimized and the candidate AP locations in the intermediate RF plans have to be changed.

For example, if the error value (e.g., "2") is greater than the threshold (e.g., "1"), then one or more parameters from the first set of parameters are adjusted based on the error value. In some examples, the one or more parameters are adjusted iteratively to calibrate the AP locations such that the network optimization score for the intermediate RF plan is same or similar relative to the reference RF plan. Based on such adjustments, an optimized first set of parameters of the first ML model is determined.

At block 516, method 500 generates an output RF plan using the first neural network based on the optimized first set of parameters. The output RF plan indicates optimized AP locations and the modified set of features. The optimized AP locations correspond to locations in the network deployment area where the bandwidth, throughput, latency, interference, or other network metrics measured at network devices is in the range of predetermined values.

Figure 6:
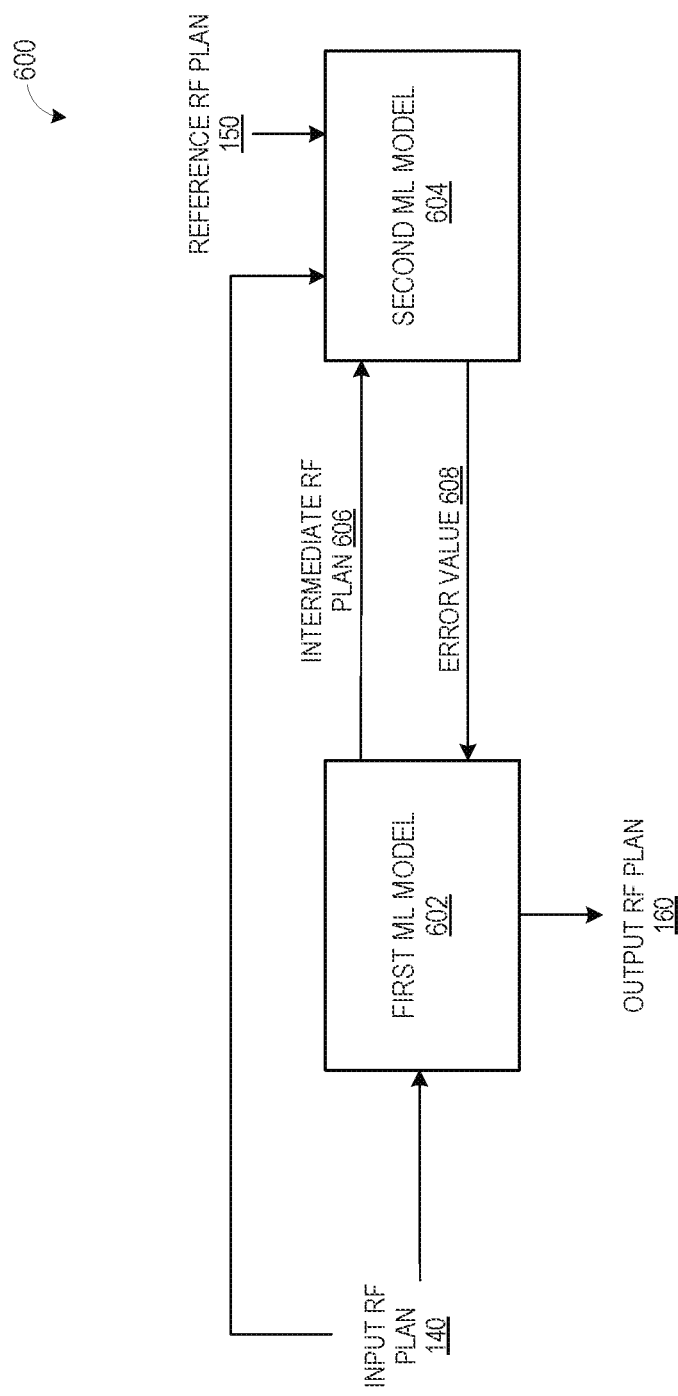
FIG. 6 is a block diagram that depicts a method to train machine learning models to generate RF plans with optimized AP locations, in accordance with an example.

FIG. 6 is a block diagram of a method to train the first ML model and the second ML model, in accordance with an example. In some examples, the first ML model may be a generative model and the second ML model may be a discriminative model of a generative adversarial network. The first ML model 602 is trained to generate an intermediate RF plan that provides a similar network optimization score as that of the reference RF plan 150. The second ML model is trained to determine the deviation in network optimization score in generated RF plan relative to the reference RF plan 150. Based on the training, the first set of parameters of the first ML model is optimized using which the first ML model may generate output RF plans indicating optimized AP locations for various modifications to a network deployment area.

In some examples, the first ML model 602 is trained to generate an intermediate RF plan 606 corresponding to an input RF plan 140 based on the first set of parameters, which may be initialized with random values, for example. The generated intermediate RF plan 606 includes candidate AP locations determined by extracting features from the input RF plan 140 using the first set of parameters. The intermediate RF plan 606 is provided as input to the second ML model 604. The second ML model 604 determines a network optimization score for the intermediate RF plan 606 and determines an error value 608 based on the second set of parameters, which may be initialized with random values. The error value 608 indicates a deviation of network optimization score for the intermediate RF plan 606 and that of the reference RF plan 150. The second ML model 604 provides the error value 608 to the first ML model 602.

The first ML model 602 updates the first set of parameters to obtain an updated first set of parameters. Based on the updated first set of parameters, the first ML model 602 generates another intermediate RF plan in a next iteration. The second ML model 604 determines another error value, which indicates a deviation of network optimization score for the intermediate RF plan 606 and that of the original AP locations in the reference RF plan 150. The training process is performed iteratively until the error value is equivalent to the predetermined value (e.g., 0). When the error value is equivalent to 0, the optimization of network metrics in the intermediate RF plan is similar to the optimization of the network metrics in the reference RF plan.

The second ML model 604 is trained by providing a random input RF plan and the reference RF plan 150. The random input RF plan is a reference RF plan with random modifications to its features and/or attributes. The second ML model determines an error value indicating a deviation of network optimization score for the random input RF plan and the original AP locations in the reference RF plan 150. The second set of parameters is updated based on the error value, for example.

In some examples, the first ML model 602 and the second ML model 604 are separately trained. For example, the first ML model 602 is initially trained with a loss function and the second ML model 604 is initially trained until it can distinguish between output RF plans from reference RF plans 150. In some examples, the second set of parameters of the second ML model 604 is fixed while training the first ML model 602. Further, the first set of parameters of the first ML model 602 is fixed while training the second ML model 604.

In other examples, the first ML model 602 and the second ML model 604 are trained together. The first set of parameters of the first ML model 602 and the second set of parameters of the second ML model 604 may be optimized in turns. For example, in a first iteration, the first ML model 602 is trained against the randomly initialized second set of parameters of the second ML model to update the first set of parameters of the first ML model. The updated first set of parameters of the first ML model is then fixed and the second ML model is trained to obtain an updated second set of parameters. In the next iteration, the updated second set of parameters of the second ML model is fixed, and the first ML model is trained.

In some examples, the first ML model 602 and the second ML model 604 are trained in turns iteratively such that the error value (i.e., difference in network optimization scores) is equivalent to a predetermined value (e.g., 0). When the error value is approximately equivalent to the predetermined value (e.g., 0), the first ML model may have learned to produce an output RF plan that achieves similar optimization as the reference RF plan.

After the training of the first ML model 602 and the second ML model 604 using a given input RF plan and reference RF plan for a given network deployment area, the first ML model 602 includes optimized first set of parameters. Based on the optimized first set of parameters, the first ML model 602 generates an output RF plan 160 with optimized AP locations for the input RF plan 140. Further, based on the first set of optimized parameters, the first ML model 602 can generate RF plans with optimized AP locations for any input RF plan of that network deployment area.

Figure 7:
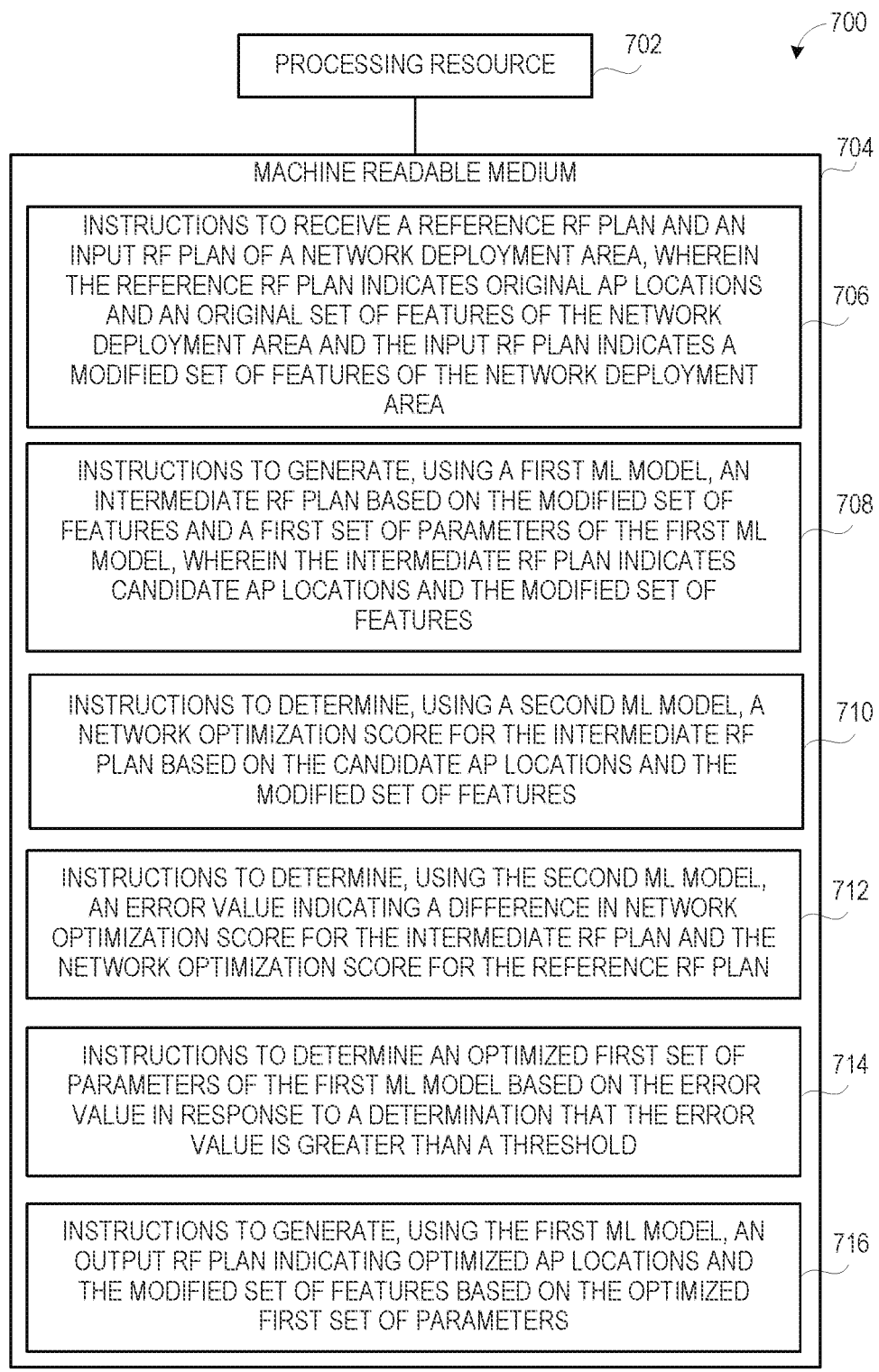
FIG. 7 is a block diagram depicting a processing resource and a machine-readable medium encoded with example instructions to generate RF plans with optimized AP locations, in accordance with an example.

Moving to FIG. 7, a block diagram 700 depicting a processing resource 702 and a machine-readable medium 704 encoded with example instructions to facilitate generation of RF plans with optimized AP locations, in accordance with an example. The machine-readable medium 704 may be non-transitory and is alternatively referred to as a non-transitory machine-readable medium 704. In some examples, the machine-readable medium 704 may be accessed by the processing resource 702. In some examples, the processing resource 702 may represent one example of the processing resource 110 of the device 102 described in relation to FIG. 1. Further, the machine-readable medium 704 may represent one example of the machine-readable medium 112 of the device 102 described in relation to FIG. 1.

The instructions 706 when executed may cause the processing resource 702 to receive a reference RF plan and an input RF plan of a network deployment area, where the reference RF plan indicates original AP locations and an original set of features of the network deployment area and the input RF plan indicates a modified set of features of the network deployment area. The instructions 708 when executed may cause the processing resource 702 to generate, using a first ML model, an intermediate RF plan based on the modified set of features and a first set of parameters of the first ML model, where the intermediate RF plan indicates candidate AP locations and the modified set of features. The instructions 710 when executed may cause the processing resource 702 to determine, using a second ML model, a network optimization score for the intermediate RF plan based on the candidate AP locations and the modified set of features. The instructions 712 when executed may cause the processing resource 702 to determine, using a second ML model, an error value indicating a difference in the network optimization score for the intermediate RF plan and the network optimization score for the reference RF plan. The instructions 714 when executed may cause the processing resource 702 to determine an optimized first set of parameters of the first ML model based on the error value in response to a determination that the error value is greater than a threshold. The instructions 714 when executed may cause the processing resource 702 to generate, using the first ML model, an output RF plan indicating optimized AP locations and the modified set of features based on the optimized first set of parameters.

As used herein, the machine-readable medium may be any electronic, magnetic, optical, or other physical storage device that may store data and/or executable instructions. For example, the machine-readable medium may include one or more of a Random Access Memory (RAM), an Electrically Erasable Programmable Read-Only Memory (EEPROM), a storage drive, a flash memory, a Compact Disc Read-Only Memory (CD-ROM), and the like. The machine-readable medium may be non-transitory. As described in detail herein, the machine-readable medium may be encoded with the executable instructions to perform one or more methods, for example, method described in FIGS. 2 and 5. In the examples described above, functionalities described as being performed by "instructions" may be understood as functionalities that may be performed by those instructions when executed by the processing resource. In other examples, functionalities described in relation to instructions may be implemented by any combination of hardware and programming.

As used herein, the processing resource may be one or more physical devices, for example, one or more central processing unit (CPU), one or more semiconductor-based microprocessors, one or more graphics processing unit (GPU), application-specific integrated circuit (ASIC), a field-programmable gate array (FPGA), other hardware devices capable of retrieving and executing instructions stored in the machine-readable medium, or combinations thereof. The processing resource may fetch, decode, and execute the instructions stored in the machine-readable medium to generate RF plans for the network deployment area. Further, the processing resource may also include at least one integrated circuit (IC), control logic, electronic circuits, or combinations thereof that include a number of electronic components for performing the functionalities intended to be performed by the device. Moreover, in certain examples, where the device may be a virtual machine or a containerized application, the processing resource and the machine-readable medium may represent a processing resource and a machine-readable medium of the hardware or a computing device that hosts the device as the virtual machine or the containerized application. In some examples, the processing resource may include virtual resources provisioned through a virtual machine executing on IaaS provider server.

A network connects a plurality of computing systems or devices, such as, servers, computers, network devices, or the like, to each other in which the examples described above may be implemented. Examples of the network may include, but are not limited to, an Internet Protocol (IP) or non-IP-based local area network (LAN), wireless LAN (WLAN), metropolitan area network (MAN), wide area network (WAN), a storage area network (SAN), a personal area network (PAN), a cellular communication network, a Public Switched Telephone Network (PSTN), and the Internet. Communication over the network may be performed in accordance with various communication protocols such as, but not limited to, Transmission Control Protocol and Internet Protocol (TCP/IP), User Datagram Protocol (UDP), IEEE 802.11, and/or cellular communication protocols. The communication over the network may be enabled via a wired (e.g., copper, optical communication, etc.) or wireless communication technologies. In some examples, the network may be enabled via private communication links including, but not limited to, communication links established via wireless, wired (e.g., copper), and the like. In some examples, the private communication links may be direct communication links between the device and the plurality of clients.

The client devices may be devices including a processor or microcontroller and/or any other electronic component, or a device or system that may facilitate various compute and/or data storage services. Examples of the client devices may include, but are not limited to, a desktop computer, a laptop, a smartphone, a server, a computer appliance, a workstation, a storage system, or a converged or hyperconverged system, and the like. The client devices may have similar or varying hardware and/or software configurations in a given implementation of the networked system. In some examples, the client devices may be a service, such as a web service or a microservice coupled through an application programming interface (API).

The term "RF plan generation device" or "device" may refer to a heterogeneous computing device facilitating resources, for example, compute, storage, and/or networking capabilities, for one or more workloads to execute thereon. Examples of the device may include, but are not limited to, a server, clusters of servers, container-orchestration systems, clusters of container-orchestration systems, a computer appliance, a workstation, a desktop computer, a laptop, a smartphone, a storage system, a converged or hyperconverged system, and the like. By way of example, while some devices may have high-end compute capabilities, some devices may facilitate strong data security, and certain devices may have enhanced thermal capabilities. Further, in certain examples, the device may be or may include a virtual machine or a containerized application executing on hardware in the network. In the examples described above, the RF plan generation device may be connected to a storage unit. The storage unit may be any type of persistent storage that is capable of storing data in a structured or unstructured format. The storage unit may be any database within an enterprise that stores and manages data including, but not limited to, RF plans, features in the RF plans, or the like.

As used herein, an RF plan may be an image depicting a visual representation of a network deployment area, showing a view from above, of relationships between the various features of the network deployment area. The visual representation may include a layout of the network devices in an area. The RF plan may also include various indicia, such as heat regions with varying intensities, lines, icons, or the like, to depict the various features of the network deployment area. The features may include information of the network deployment area and may include, but not limited to, walls, rooms, user densities, traffic patterns, ceilings, or the like.

As used herein, a reference RF plan may refer to an RF plan depicting the features of an existing network deployment area. The term original AP location may refer to the location of an AP in the existing network deployment area. An input RF plan may refer to an RF plan that includes features of an existing network deployment area or a new network deployment area. An output RF plan may refer to an RF plan that indicated the optimized AP locations for a network deployment area depicted in the input RF plan. As used herein, a network deployment area may refer to a site, such as a building, a floor, a campus, or the like, where a network (wired and/or wireless) including a plurality of network devices may be deployed, installed, and operated. In some examples, the network deployment area may be an area with an existing wired and/or wireless network of devices that are already deployed in that area. In other examples, the network deployment area may be a new area where a plurality of network devices may be planned for deployment.

The first and second ML models may be one of an artificial neural network (ANN), convolutional neural network (CNN), a generative model, a discriminative model, or the like, or a combination thereof. The first ML model may be trained to generate an RF plan with AP locations that achieve similar network optimization of a reference RF plan. The second ML model may determine whether the optimization achieved by the first ML model deviates from that of the reference RF plan. The first and second set of parameters may be numerical values (e.g., weights and biases) that are applied (e.g., multiplied) to the data that is input into the first and second ML models. The first and second set of parameters of the first and second ML models are learnable parameters that can change over time with the training of the ML models.

An access point (AP) allows a client device to connect to a wired or wireless network. APs may connect to a router or a gateway as a standalone device, or alternatively the APs may be an integral component of the router or gateway itself in some examples.

An administrator is a person, network service, or combination thereof that has administrative access to network devices and configures devices to conform to a network topology. An administration device may be a device or a system operated by an administrator.

Although the present disclosure has been described in detail, it should be understood that various changes, substitutions and alterations can be made without departing from the spirit and scope of the disclosure. Any use of the words "may" or "can" in respect to features of the disclosure indicates that certain examples include the feature and certain other examples do not include the feature, as is appropriate given the context. Any use of the words "or" and "and" in respect to features of the disclosure indicates that examples can contain any combination of the listed features, as is appropriate given the context.

Phrases and parentheticals beginning with "e.g." or "i.e." are used to provide examples merely for the purpose of clarity. It is not intended that the disclosure be limited by the examples provided in these phrases and parentheticals. The scope and understanding of this disclosure may include certain examples that are not disclosed in such phrases and parentheticals.

We claim:

1. A non-transitory machine-readable medium comprising instructions that, when executed by a processing resource of a computing device, cause the computing device to:
   receive a reference radio frequency (RF) plan and an input RF plan of a network deployment area, wherein the reference RF plan indicates original access point (AP) locations and an original set of features of the network deployment area, wherein the input RF plan indicates a modified set of features of the network deployment area, wherein the original set of features and the modified set of features comprise at least spatial features and network features associated with the network deployment area, and wherein the network features comprise AP metrics of throuqhput or bandwidth;
   extract, using an image segmentation process implemented by a first machine learning (ML) model, a group of pixels from the input RF plan;
   label, using the first ML model, a feature of each group of pixels from the input RF plan;
   generate, using the first ML model, an intermediate RF plan based on the modified set of features, the label of the feature of each group of pixels, and a first set of parameters of the first ML model, wherein the intermediate RF plan indicates candidate AP locations and the modified set of features;
   provide, by the first ML model to a second ML model, the intermediate RF plan;
   determine, using the second ML model, a network optimization score for the intermediate RF plan based on the candidate AP locations and the modified set of features;
   determine, using the second ML model, an error value indicating a difference in the network optimization score for the intermediate RF plan and the network optimization score for the reference RF plan;
   provide, by the second ML model to the first ML model, the error value;
   in response to a determination that the error value is greater than a threshold, determine an optimized first set of parameters of the first ML model based on the error value; and
   generate, using the first ML model, an output RF plan indicating optimized AP locations and the modified set of features based on the optimized first set of parameters.

2. The non-transitory machine-readable medium of claim 1, further comprising instructions to:
   receive a new input RF plan indicating a new modified set of features of the network deployment area; and
   generate a new output RF plan based on the new modified set of features and the optimized first set of parameters, wherein the new output RF plan indicates the optimized AP locations for the network deployment area.

3. The non-transitory machine-readable medium of claim 1, wherein the instructions to generate the intermediate RF plan includes instructions to:
   extract the modified set of features from the input RF plan based on a segmentation of the input RF plan;
   predict, using the first ML model, the candidate AP locations based on the modified set of features extracted from the input RF plan;
   encode the modified set of features extracted from the input RF plan into a latent space dataset based on the first set of parameters of the first ML model; and
   generate the intermediate RF plan indicating the candidate AP locations by decoding the latent space dataset based on the first set of parameters of the first ML model.

4. The non-transitory machine-readable medium of claim 3, wherein the instructions to extract the modified set of features from the input RF plan based on the segmentation of the input RF plan includes instructions to:
- segment the input RF plan into a plurality of groups, wherein each group of the plurality of groups is associated with a property; and
- classify each group of the plurality of groups into a feature of the modified set of features.

5. The non-transitory machine-readable medium of claim 1, wherein the instructions to determine the network optimization score includes instructions to:
- predict, using the second ML model, network metrics values based on the modified set of features and the candidate AP locations; and
- compute the network optimization score based on the network metrics values.

6. The non-transitory machine-readable medium of claim 1, wherein the spatial features include one or more of walls, rooms, open areas, partitions, or ceiling, and the network features include one or more of user density or AP metrics.

7. The non-transitory machine-readable medium of claim 1, wherein the output RF plan is associated with one or more of a higher bandwidth, a higher throughput, a lower interference, a lower latency, a higher availability, a lower packet loss, or a higher connectivity, relative to a random RF plan for the network deployment area.

8. The non-transitory machine-readable medium of claim 1, wherein the first ML model is a generative model and the second ML model is a discriminative model.

9. A device comprising:
- a processing resource;
- a machine-readable medium storing instructions that, when executed by the processing resource, cause the processing resource to:
  - receive a reference radio frequency (RF) plan and an input RF plan of a network deployment area, wherein the reference RF plan indicates original access point (AP) locations and an original set of features of the network deployment area, wherein the input RF plan indicates a modified set of features of the network deployment area, wherein the original set of features and the modified set of features comprise at least spatial features and network features associated with the network deployment area, and wherein the network features comprise AP metrics of throuqhput or bandwidth;
  - extract, using an image segmentation process implemented by a first machine learning (ML) model, a group of pixels from the input RF plan;
  - label, using the first ML model, a feature of each group of pixels from the input RF plan;
  - generate, using the first ML model, an intermediate RF plan based on the modified set of features, the label of the feature of each group of pixels, and a first set of parameters of the first ML model, wherein the intermediate RF plan indicates candidate AP locations and the modified set of features;
  - provide, by the first ML model to a second ML model, the intermediate RF plan;
  - determine, using the second ML model, a network optimization score for the intermediate RF plan based on the candidate AP locations and the modified set of features;
  - determine, using the second ML model, an error value indicating a difference in the network optimization score for the intermediate RF plan and the network optimization score for the reference RF plan;
  - provide, by the second ML model to the first ML model, the error value;
  - in response to a determination that the error value is greater than a threshold, determine an optimized first set of parameters of the first ML model based on the error value; and
  - generate, using the first ML model, an output RF plan indicating optimized AP locations and the modified set of features based on the optimized first set of parameters.

10. The device of claim 9, wherein the processing resource executes one or more of the instructions to:
- receive a new input RF plan indicating a new modified set of features of the network deployment area; and
- generate a new output RF plan based on the new modified set of features and the optimized first set of parameters, wherein the new output RF plan indicates the optimized AP locations for the network deployment area.

11. The device of claim 9, wherein the processing resource executes one or more of the instructions to:
- extract the modified set of features from the input RF plan based on a segmentation of the input RF plan;
- predict, using the first ML model, the candidate AP locations based on the modified set of features extracted from the input RF plan;
- encode the modified set of features extracted from the input RF plan into a latent space dataset based on the first set of parameters of the first ML model; and
- generate the output RF plan indicating the candidate AP locations by decoding the latent space dataset based on the first set of parameters of the first ML model.

12. The device of claim 11, wherein to extract the modified set of features from the input RF plan based on the segmentation of the input RF plan, the processing resource executes one or more of the instructions to:
- segment the input RF plan into a plurality of groups, wherein each group of the plurality of groups is associated with a property; and
- classify each group of the plurality of groups into a feature of the modified set of features.

13. The device of claim 9, wherein to determine the network optimization score, the processing resource executes one or more of the instructions to:
- predict, using the second ML model, network metrics values based on the modified set of features and the candidate AP locations; and
- compute the network optimization score based on the network metrics values.

14. A method comprising:
- receiving a reference radio frequency (RF) plan and an input RF plan of a network deployment area, wherein the reference RF plan indicates original access point (AP) locations and an original set of features of the network deployment area, wherein the input RF plan indicates a modified set of features of the network deployment area, wherein the original set of features and the modified set of features comprise at least spatial features and network features associated with the network deployment area, and wherein the network features comprise AP metrics of throuqhput or bandwidth;
- extracting, using an image segmentation process implemented by a first machine learning (ML) model, a group of pixels from the input RF plan;
- labeling, using the first ML model, a feature of each group of pixels from the input RF plan;

generating, using the first ML model, an intermediate RF plan based on the modified set of features, the label of the feature of each group of pixels, and a first set of parameters of the first ML model, wherein the intermediate RF plan indicates candidate AP locations and the modified set of features;

providing, by the first ML model to a second ML model, the intermediate RF plan;

determining, using the second ML model, a network optimization score for the intermediate RF plan based on the candidate AP locations and the modified set of features;

determining, using the second ML model, an error value indicating a difference in the network optimization score for the intermediate RF plan and the network optimization score for the reference RF plan;

providing, by the second ML model to the first ML model, the error value;

in response to a determination that the error value is greater than a threshold, determining an optimized first set of parameters of the first ML model based on the error value; and generating, using the first ML model, an output RF plan indicating optimized AP locations and the modified set of features based on the optimized first set of parameters.

15. The method of claim 14, further comprising:

receiving a new input RF plan indicating a new modified set of features of the network deployment area; and generating a new output RF plan based on the new modified set of features and the optimized first set of parameters, wherein the new output RF plan indicates the optimized AP locations for the network deployment area.

16. The method of claim 14, wherein determining the network optimization score includes:

predicting, using the second ML model, network metrics values based on the modified set of features and the candidate AP locations; and computing the network optimization score based on the network metrics values.

17. The method of claim 14, further comprising training the first ML model by:

determining an updated first set of parameters by updating the first set of parameters based on the error value;

updating the intermediate RF plan indicating updated candidate AP locations based on the updated first set of parameters and the modified set of features;

determining, using the second ML model, an updated error value for the intermediate RF plan; and performing multiple iterations of the determining, updating, and the determining, based on a determination that the error value is not in a range of predetermined values.

18. The method of claim 17, further comprising training the second ML model by:

providing the reference RF and a random RF plan of the network deployment area to the second ML model;

determining the error value indicating the difference in the network optimization score for the random RF plan and the network optimization score for the reference RF plan; and determining an updated second set of parameters by updating a second set of parameters of the second ML model based on the error value.

19. The method of claim 18, wherein training the first ML model includes determining the updated first set of parameters while the second set of parameters of the second ML model is fixed, and wherein training the second ML model includes determining the updated second set of parameters while the first set of parameters is fixed.

* * * * *